(12) United States Patent
Tomoda et al.

(10) Patent No.: US 10,745,203 B2
(45) Date of Patent: Aug. 18, 2020

(54) TRANSPORT SYSTEM, CONTROL METHOD, PROCESSING SYSTEM, AND MANUFACTURING METHOD OF ARTICLE

(71) Applicant: CANON KABUSHIKI KAISHA, Tokyo (JP)

(72) Inventors: Koji Tomoda, Komae (JP); Takeshi Yamamoto, Fujisawa (JP); Hidetada Narahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/393,448

(22) Filed: Apr. 24, 2019

(65) Prior Publication Data

US 2019/0344967 A1 Nov. 14, 2019

(30) Foreign Application Priority Data

May 11, 2018 (JP) .................................. 2018-092353

(51) Int. Cl.
*B65G 17/12* (2006.01)
*B65G 43/00* (2006.01)

(52) U.S. Cl.
CPC ............. *B65G 17/12* (2013.01); *B65G 43/00* (2013.01); *B65G 2203/0266* (2013.01); *B65G 2203/0283* (2013.01)

(58) Field of Classification Search
CPC . B65G 17/12; B65G 43/00; B65G 2203/0283
See application file for complete search history.

(56) References Cited

U.S. PATENT DOCUMENTS

| | | | |
|---|---|---|---|
| 5,032,975 A | 7/1991 | Yamamoto | |
| 5,136,222 A | 8/1992 | Yamamoto | |
| 6,078,663 A | 6/2000 | Yamamoto | |
| 6,597,790 B1 | 7/2003 | Yamamoto | |
| 7,071,865 B2 | 7/2006 | Shibamiya | |
| 7,296,234 B2 | 11/2007 | Fukuda | |
| 7,496,278 B2 | 2/2009 | Miyamoto | |
| 7,522,087 B2 | 4/2009 | Shibamiya | |
| 8,023,802 B2 | 9/2011 | Miyamoto | |
| 10,118,774 B2 | 11/2018 | Tomoda | |
| 10,158,304 B2 | 12/2018 | Suzuki | |
| 10,294,042 B2 | 5/2019 | Tomoda | |
| 2011/0166703 A1* | 7/2011 | Byrne | B25J 9/1682 700/246 |

(Continued)

FOREIGN PATENT DOCUMENTS

JP 2015-208083 11/2015

*Primary Examiner* — Gene O Crawford
*Assistant Examiner* — Lester Ill Rushin
(74) *Attorney, Agent, or Firm* — Venable LLP

(57) ABSTRACT

An embodiment includes a plurality of transport modules forming a transport path on which a carriage travels and a plurality of control units each provided to corresponding one of the plurality of transport modules and configured to perform position control of the carriage in accordance with a pre-stored drive condition and a control start timing, and one of the plurality of control units which corresponds to a first transport module that is one of the plurality of transport modules corrects the drive condition by using a difference between an entry timing at which the carriage enters the first transport module and the control start timing.

16 Claims, 10 Drawing Sheets

(56) References Cited

U.S. PATENT DOCUMENTS

| | | |
|---|---|---|
| 2016/0355350 A1 | 12/2016 | Yamamoto |
| 2017/0117829 A1 | 4/2017 | Yamamoto |
| 2018/0334338 A1 | 11/2018 | Yamamoto |
| 2019/0092572 A1 | 3/2019 | Fujii |
| 2019/0092578 A1 | 3/2019 | Umeyama |
| 2019/0097515 A1 | 3/2019 | Ota |

* cited by examiner

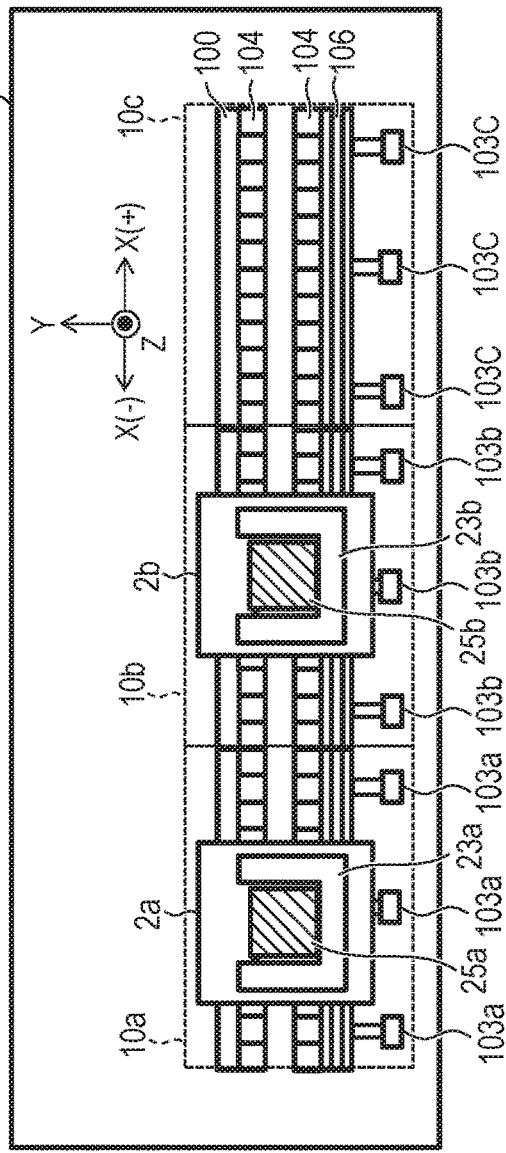
FIG. 1A
FIG. 1B
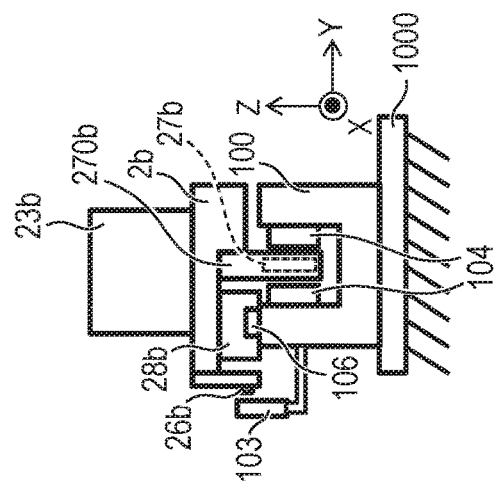
FIG. 1C

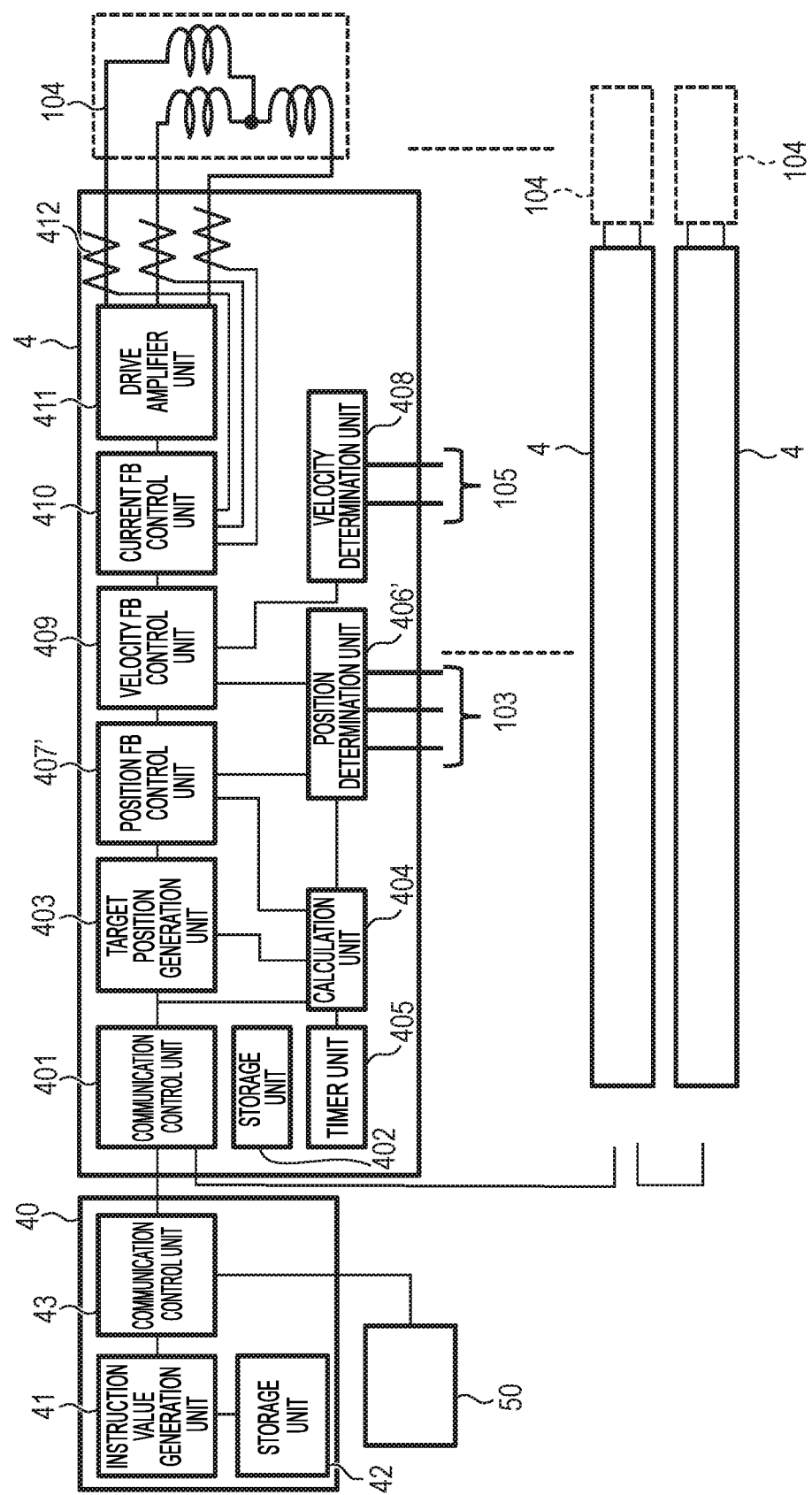

TRANSPORT SYSTEM, CONTROL METHOD, PROCESSING SYSTEM, AND MANUFACTURING METHOD OF ARTICLE

BACKGROUND OF THE INVENTION

Field of the Invention

The present invention relates to a transport system, a control method, a processing system, and a manufacturing method of an article.

Description of the Related Art

In a factory automation (FA) production line used for assembling industrial products, a transport system that transports components or the like is used.

In recent years, a movable magnet type linear motor system has been proposed as a transport system. The movable magnet type linear motor system has a needle on which a plurality of field permanent magnets are mounted such that N-pole and S-pole are alternately arranged on a line, a coil arranged along the moving path of the needle, and a current controller that supplies a current to the coil.

Further, since the length of a transport path varies in accordance with a system, a transport system in which an encoder that measures the position of a carriage, a coil that applies a torque to the carriage, or the like are integrated in a transport module and a plurality of transport modules are connected has been proposed.

In a transport system disclosed in Japanese Patent Application Laid-Open No. 2015-208083, accuracy of the controllability and the stop position of a carriage near the boundary of the transport module is improved by switching a signal input to the current controller.

SUMMARY OF THE INVENTION

In the transport system disclosed in Japanese Patent Application Laid-Open No. 2015-208083, however, a switch unit used for switching a signal input to the current controller is necessary, and there are problems of increase in size of the device, increase in cost, increase in complexity of control, or the like.

The present invention has been made in view of the problems described above and intends to provide a transport system and a control method thereof capable of improving the controllability of the carriage near the boundary of the transport module with a simple configuration.

A transport system according to one embodiment includes a plurality of transport modules forming a transport path on which a carriage travels and a plurality of control units each provided to corresponding one of the plurality of transport modules and configured to perform position control of the carriage in accordance with a pre-stored drive condition and a control start timing, and one of the plurality of control units which corresponds to a first transport module that is one of the plurality of transport modules corrects the drive condition by using a difference between an entry timing at which the carriage enters the first transport module and the control start timing.

A control method of a transport system according to another embodiment is a control method of a transport system including a plurality of transport modules forming a transport path on which a carriage travels and a plurality of control units each provided to corresponding one of the plurality of transport modules and configured to perform position control of the carriage in accordance with a pre-stored drive condition and a control start timing, and the control method includes a step of: at one of the plurality of control units which corresponds to a first transport module that is one of the plurality of transport modules, correcting the drive condition by using a difference between an entry timing at which the carriage enters the first transport module and the control start timing.

Further features of the present invention will become apparent from the following description of exemplary embodiments with reference to the attached drawings.

BRIEF DESCRIPTION OF THE DRAWINGS

FIG. 1A, FIG. 1B, and FIG. 1C are schematic diagrams illustrating a configuration of a transport system according to a first embodiment of the present invention.

FIG. 8 is a block diagram of the transport system according to the second embodiment of the present invention.

DESCRIPTION OF THE EMBODIMENTS

First Embodiment

Figure 2:
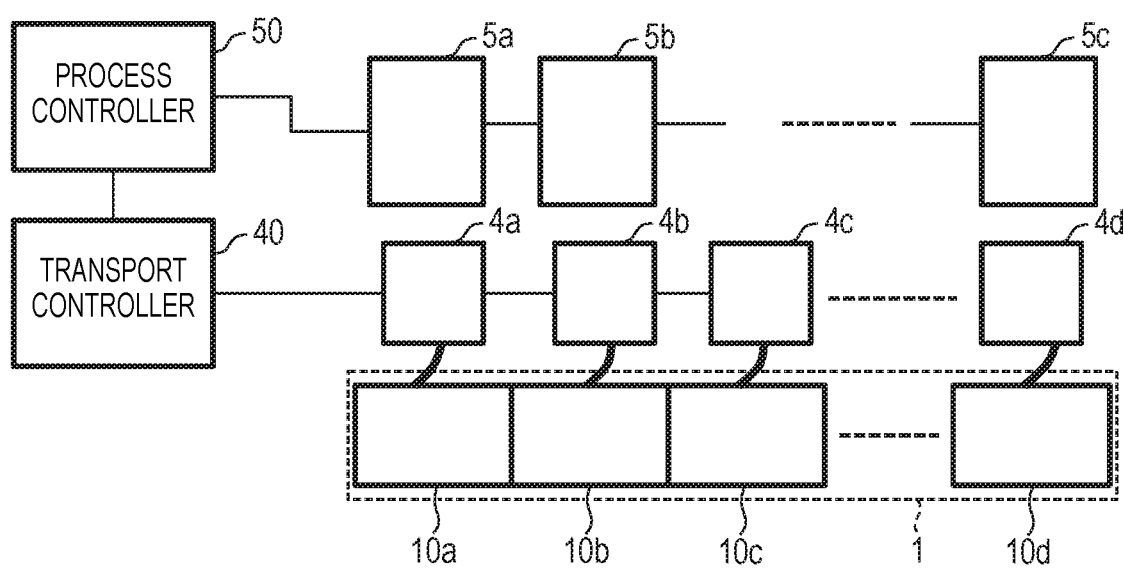
FIG. 2 is a block diagram illustrating a configuration of a work processing system including the transport system according to the first embodiment of the present invention.

A first embodiment of the present invention will be described below with reference to the drawings. Note that, in the following descriptions and drawings, when a plurality of the same components are distinguished, a small letter alphabet is further added as an identifier at the end of the same numeral reference, and when a plurality of the same components are not required to be distinguished, the identifier is omitted and only a numeral reference is used.

FIG. 1A, FIG. 1B, and FIG. 1C are schematic diagrams illustrating a configuration of a transport system according to the present embodiment. FIG. 1A is a top view of the transport system, FIG. 1B is a side view of the transport system, and FIG. 1C is a front view of the transport system. Note that, in FIG. 1A, FIG. 1B, and FIG. 1C, a moving (traveling) direction of a carriage 2 is denoted as the X-axis direction, a vertical direction is denoted as the Z-axis direction, and a direction orthogonal to the X-axis direction and the Z-axis direction is denoted as the Y-axis direction. Further, in the X-axis direction, a direction from a carriage 2a to a carriage 2b, that is, a direction toward the downstream side of a transport path 1 is denoted as positive (+), and the opposite direction thereto is denoted as negative (−).

The transport system is installed in a factory or the like, for example. A pedestal 1000 as a roadbed is laid on the factory floor, and a plurality of transport modules 10 are aligned and installed on the pedestal 1000. A plurality of transport modules 10 form the transport path 1 of the carriage 2, and the carriage 2 can travel along the transport path 1. Further, on the transport path 1, a process apparatus for processing or the like is appropriately installed. In the present embodiment, a transport system having the process apparatus may be referred to as a processing system. While three transport modules 10a, 10b, and 10c are illustrated in FIG. 1A, FIG. 1B, and FIG. 1C for simplicity of the drawings, the number of the transport modules is not limited thereto. Further, while two carriages 2a and 2b are illustrated, the number of the carriages is also not limited thereto.

Each of the transport modules 10 has a casing 100, a position detection unit 103, and an armature 104. A guide 106 is provided to the casing 100, and the carriage 2 is movable along the guide 106. The casing 100 has a recess in a section orthogonal to the traveling direction (X-axis). The transport apparatus forms a movable magnet type linear motor, and armatures 104 that serve as stators are attached to each of the inner-side faces of the recess of the casing 100 so as to face each other. Further, the armatures 104 are aligned and arranged along the moving direction of the carriage 2 in the order of the U phase, the V phase, and the W phase. Each of the armatures 104 is formed of a set of coils wound around a pole iron core and is driven by a control unit described below.

A plurality of position detection units 103 are attached to one side face of the casing 100 at a certain interval. For example, the position detection unit 103 is formed of an optical encoder or the like and can determine the position of the carriage 2 by reading position information stored in a scale 26 of the carriage 2.

The carriage 2 has a holding unit 23, the scale 26, a bearing 28, and a magnet 27. The bearing 28 is provided at the lower part of the carriage 2. The bearing 28 is attached to the guide 106 of the casing 100, and the carriage 2 is supported so as to be movable on the guide 106. At the lower part of the carriage 2, a supporting plate 270 inserted into the recess of the casing 100 is provided. A plurality of magnets (permanent magnets) 27 are arranged on the support plate 270 along the moving direction of the carriage 2 such that different poles appear alternately. When the magnets 27 receive electromagnetic force from the armatures 104, the carriage 2 travels on the transport module 10.

The holding unit 23 is attached to the carriage 2 and holds a work 25. On the side part of the carriage 2, the scale 26 is provided along the moving direction thereof. As described above, position information is stored in the scale 26. The position detection unit 103 is provided at a predetermined position of the side face of the casing 100 so as to face the scale 26. The position detection unit 103 may be an encoder, for example, and attached at an interval shorter than the scale length of the scale 26. Thereby, when the carriage 2 is present on the transport module 10, at least one of a plurality (three in the case of FIG. 1A and FIG. 1B) of position detection units 103 can read the scale 26.

FIG. 2 is a block diagram illustrating a configuration of a work processing apparatus having the transport apparatus according to the present embodiment. A plurality of transport modules 10a, 10b, 10c, . . . , 10d form the transport path 1. Further, the transport modules 10a, 10b, 10c, . . . , 10d are provided with corresponding control units 4a, 4b, 4c, . . . , 4d, respectively. As described above, the control unit 4 is connected to the armature 104 of the transport module 10 and can transport the carriage 2 by supplying a field current to the coil of the armature 104. The control units 4a, 4b, 4c, . . . , 4d may be formed of separate control apparatuses or may be a single control apparatus, respectively.

A transport controller 40 is communicably connected in cascade to a plurality of control units 4. The transport controller 40 functions as a higher-level control unit of the control units 4 and transmits and receives information related to the transport of the carriage 2 to and from a plurality of control units 4. In such a way, the control unit 4 can cause each carriage 2 to travel freely on the transport path 1 formed of a plurality of transport modules 10.

A process apparatus 5 is installed adjacent to the transport module 10. In the example of FIG. 2, the process apparatuses 5a, 5b, . . . , 5d are installed adjacent to the transport modules 10a, 10b, . . . , 10d, respectively. The process apparatus 5 can supply or output the work 25 on the holding unit 23 of the carriage 2 and perform a predetermined processing on the work 25 held on the carriage 2. The work 25 is then processed, and an article such as an electronic device is manufactured. Various processing may be performed by the process apparatus 5, which may include, for example, assembly of components on the work 25, application of an adhesive agent, removal of components, inspection of the work 25, irradiation of the work 25 with a light, or the like.

A process controller 50 is communicably connected in cascade to a plurality of process apparatuses 5a, 5b, . . . , 5c. The process apparatus 5 can perform a predetermined processing or the like by transmitting and receiving information related to a process to and from the process controller 50. The process controller 50 is also connected to the transport controller 40 and can control the entire operation of supply, transport, processing, and output of the work 25.

Figure 3:
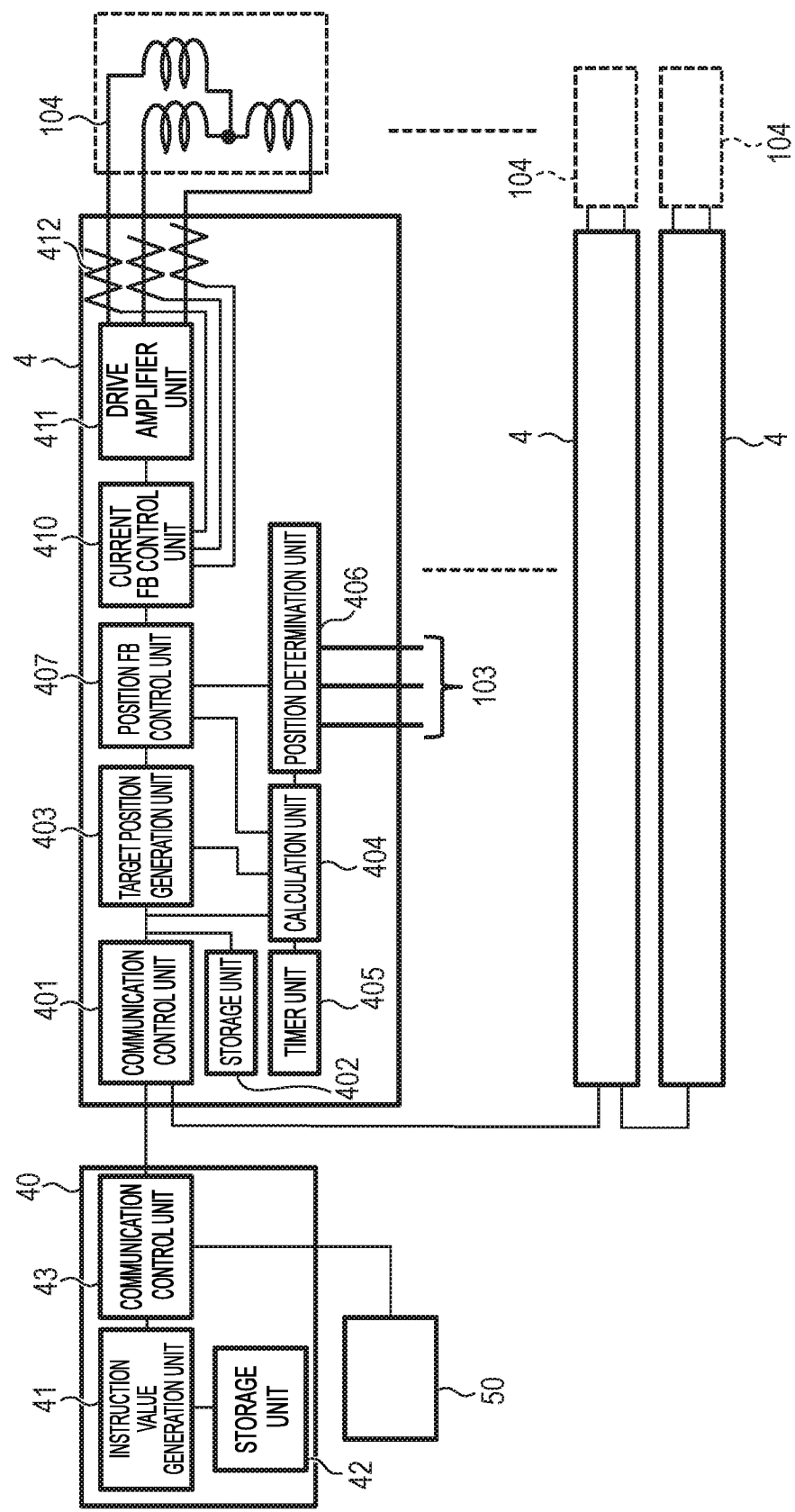
FIG. 3 is a block diagram of the transport system according to the first embodiment of the present invention.

FIG. 3 is a block diagram of the transport system of the present embodiment and mainly illustrates a detail configuration of the transport controller 40 and the control unit 4.

The transport controller 40 has an instruction value generation unit 41, a storage unit 42, and a communication control unit 43. The instruction value generation unit 41 generates a drive profile for each carriage 2. The drive profile is information used for moving the carriage 2 and includes information related to a moving distance and a velocity of the carriage 2. The communication control unit 43 transmits and receives various control signals and control data to and from a plurality of control units 4 and the process controller 50 connected to the transport controller 40 at a predetermined timing. The storage unit 42 stores various parameters of the transport apparatus, for example, the number and arrangement of the transport modules 10 or the setting related to a stop position and driving the carriage 2. The drive profile generated in the instruction value generation unit 41 is calculated by using a parameter stored in the storage unit 42.

The control unit 4 has the communication control unit 401, the storage unit 402, a target position generation unit 403, a calculation unit 404, a timer unit 405, a position determination unit 406, a position feedback (FB) control unit 407, a current FB control unit 410, a drive amplifier unit 411, and a current detection unit 412.

The communication control unit 401 is connected to the communication control unit 43 of the transport controller 40 and transmits and receives the control signals or control data to and from the transport controller 40 at a predetermined timing. Further, the communication control unit 401 is connected in cascade to the communication control unit 401 of other control units 4.

The storage unit 402 is formed of a random access memory (RAM), a non-volatile memory, or the like, stores a drive profile transmitted from the transport controller 40, and transmits the drive profile to the target position generation unit 403 at a predetermined timing.

The target position generation unit 403 generates a target position of the carriage 2 based on the received drive profile. Further, the target position generation unit 403 can switch the target position in response to the result output from the calculation unit 404.

The calculation unit 404 determines whether or not the carriage 2 is located on the transport module 10, that is, whether or not the carriage 2 has entered the transport module 10 based on the determination result from the position determination unit 406. When the carriage 2 is located on the transport module 10, the calculation unit 404 calculates a position deviation that is a position displacement relative to the target position of the carriage 2. The calculation unit 404 of the control unit 4b calculates the position deviation by using a difference between a control start time t2 of the carriage 2 and the time when the carriage 2 enters the transport module 10b based on the drive profile of the carriage 2, for example. The position deviation calculated by the calculation unit 404 is output to the position FB control unit 407 and the target position generation unit 403, respectively.

The timer unit 405 is a timer synchronized with an operation clock of a central processing unit (CPU) that controls the control unit 4. The timer unit 405 starts counting (counting time) the signal of the timer unit 405 at the timing (control start timing) at which the transport start instruction from the transport controller 40 is received.

The position determination unit 406 inputs a signal from the position detection unit 103. The position detection unit 103 outputs a signal that represents position information by reading the scale 26 of the carriage 2, and the position determination unit 406 determines the position of the carriage 2 based on the input signal.

The position FB control unit 407 compares the position of the carriage 2 determined by the position determination unit 406 with the target position of the carriage 2 generated by the target position generation unit 403 and performs Proportional Integral Differential Controller (PID) control based on the comparison result. The position FB control unit 407 outputs a control instruction value by the PID control to the current FB control unit 410. Further, when the transport control of the carriage 2 is started by the control unit 4, the position FB control unit 407 generates the control instruction value by using the position deviation output from the calculation unit 404 and outputs the control instruction value to the current FB control unit 410.

The current FB control unit 410 compares the control instruction value output from the position FB control unit 407 with a current value determined by the current detection unit 412 and generates the current instruction value output to the drive amplifier unit 411 in accordance with the comparison result. The drive amplifier unit 411 converts the current instruction value input from the current FB control unit 410 into three-phase AC instruction values of U, V, and W phases and controls the current flowing to the armatures 104. The armatures 104 are driven by a three-phase alternating current formed of U, V, and W phases and are connected such that the sum of the currents flowing to each phase becomes zero.

The current detection unit 412 is formed of a resistance element, a hall element, or the like, measures a current value flowing through the armature 104, and feeds back the measured current value to the current FB control unit 410. By performing such current feedback control, it is possible to improve the responsiveness of the carriage 2.

Figure 4A:
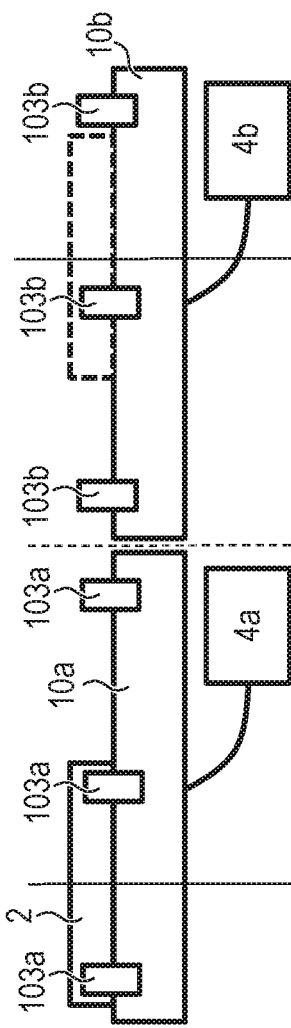
FIG. 4A and FIG. 4B are diagrams illustrating a control method of the transport system according to the first embodiment of the present invention.
Figure 4B:
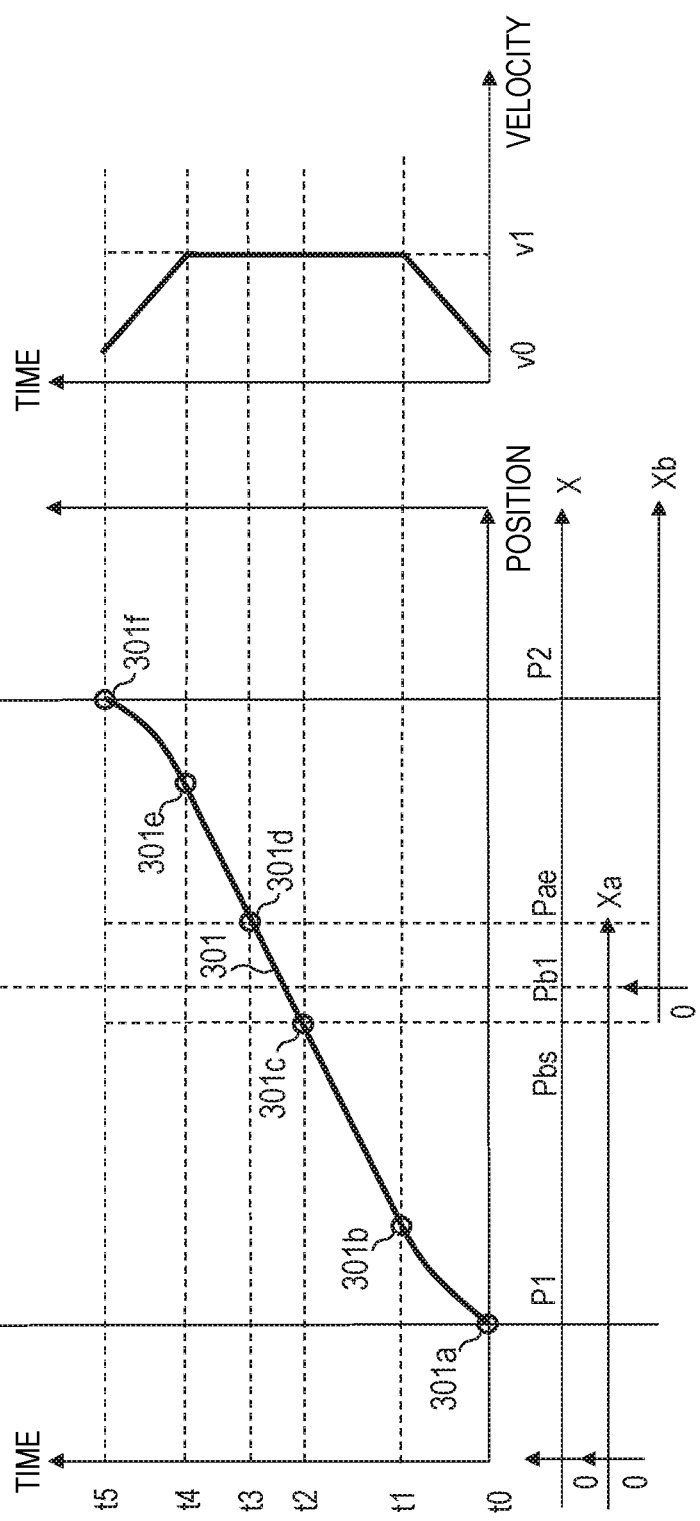

FIG. 4A and FIG. 4B are diagrams illustrating a control method according to the present embodiment. FIG. 4A represents the general configuration of the transport system in which the carriage 2 moves across the transport modules 10a and 10b. To simplify the description, two adjacent transport modules 10a and 10b are illustrated here. The left diagram in FIG. 4B represents the transport profile 301 of the carriage 2, the horizontal axis represents the position of the carriage 2 in the X-direction, and the vertical axis represents time. Here, the central position in the transport (traveling) direction of the carriage 2 is denoted as the position of the carriage 2. In the transport profile 301 in the left diagram in FIG. 4B, a point 301a corresponds to time t0, a point 301b corresponds to time t1, and a point 301c corresponds to time t2. Further, a point 301d corresponds to time t3, a point 301e corresponds to time t4, and a point 301f corresponds to time t5. The right diagram in FIG. 4B represents the transport profile 301 of the left diagram in FIG. 4B as a velocity profile, the horizontal axis represents velocity of the carriage 2, and the vertical axis represents time.

The carriage 2 is stopped at a position 301a (P1) of the transport module 10a. The control units 4a and 4b receive the transport start instruction from the transport controller 40 and start transport control of the carriage 2. The transport profile 301 represents the time change of the position of one carriage 2 from the point 301a to the point 301f (P2) and represents the transport control in one or more control units 4.

The transport profile 301 illustrated in FIG. 4B starts from the point 301a and ends at the point 301f. At the time t0, first, the control unit 4a starts position control of the carriage 2 by driving the transport module 10a. The carriage 2 starts moving at a velocity v0 from a stop state. At the time t0 to the time t1, the control unit 4a accelerates the carriage 2. At the time t1, the carriage 2 has a velocity v1 (>v0) and passes through the position 301b. At the time t1 to the time t2, the control unit 4a moves the carriage 2 at the velocity v1.

At the time t2, the carriage 2 reaches a position that can be read by the position detection unit 103b of the transport module 10b, and the control unit 4b starts transport control based on the transport profile 301. That is, with the scale 26 of the carriage 2 reaching a position facing the position detection unit 103 of the transport module 10b, the control unit 4b can acquire position information and starts position control of the carriage 2. In the present specification, the timing at which the carriage 2 reaches a position readable by the position detection unit of each transport module is referred to as an entry timing. The control unit 4b performs position control of the carriage 2, and the carriage 2 continues to move while maintaining the velocity v1. Note that the time t2 and a position Pbs at which the transport module 10b starts position control are stored in the storage unit 402 of the control unit 4 as parameters.

At the time t3, the rear end of the scale 26 of the carriage 2 reaches the limit of the position that can be read by the position detection unit 103a of the transport module 10a, and the control unit 4a of the transport module 10a ends position control. A position Pae at which the transport module 10a ends position control is stored in the storage unit 42 of the control unit 4 as the parameter (element) of the transport profile 301. The control unit 4a performs position control within a range from the position 301a (P1) to the point 301d (Pae) in accordance with the transport profile 301.

At the time t3 to the time t4, the control unit 4b moves the carriage 2 at the velocity v1. The control unit 4b decelerates the carriage 2 from the velocity v1 to the velocity v0 at the time t4 to the time t5, and the control unit 4b stops the carriage 2 at the time t5. That is, the control unit 4b performs position control in a range from the point 301c to the point 301f in accordance with the transport profile 301. Near the boundary Pb1 between the transport modules 10a and 10b, that is, in a range from the point 301c to the point 301d interposing the boundary Pb1, the control units 4a and 4b both perform position control of one carriage 2.

Here, in FIG. 4B, the position coordinate that represents the transport modules 10a and 10b by one common coordinate system is denoted as "X", and the position coordinates in respective transport modules 10a and 10b are denoted as "Xa" and "Xb". Further, the velocity of the carriage 2 is denoted as "v" as described above. The position coordinates X, Xa, and Xb, and the velocity v can represent their attributes in which points on the transport profile 301 are used as arguments, respectively. For example, "X (301a)" represents the X-coordinate of the carriage 2 at the point 301a on the transport profile 301, and "Xa (301a)" represents the Xa-coordinate of the carriage 2 at the point 301a on the transport profile 301. Similarly, "v (301a)" represents velocity of the carriage 2 at the point 301a on the transport profile 301.

Next, the drive profile will be described. The drive profile represents position control with the carriage 2 being present in each transport module 10 by using one or more drive elements (drive conditions). Here, the drive element represents the transport state of the carriage 2 in combination of a start position, an end position, a start position velocity, and an end position velocity. One drive element is described by (a start position, an end position, a start position velocity, an end position velocity), for example.

In the present embodiment, in addition to the four items described above, time period (control start time) from the time when the transport start instruction is issued to the time when each transport module 10 starts drive control of the carriage 2 is included in the drive element. Therefore, the drive element is described by (the start position, the end position, the start position velocity, the end position velocity, the control start time). The drive profile for the carriage 2 can be represented by describing the arrangement of the drive elements for one carriage 2 in time order in parenthesis { }.

Further, when one transport start instruction is transmitted from the transport controller 40, one or more carriages 2 pass through and stop on one transport module 10. Therefore, a description of one or more drive profiles for one transport module 10 in parenthesis [ ] is referred to as a "module drive instruction" for the transport module 10.

In FIG. 4B, for example, a module drive instruction transmitted from the transport controller 40 to the control unit 4a is described as follows.

$$[\{(Xa(301a), Xa(301b), v0, v1, t0), (Xa(301b), Xa(301d), v1, v1, t1)\}] \quad \text{(Equation 1)}$$

Further, a module drive instruction transmitted from the transport controller 40 to the control unit 4b is described as follows.

$$[\{(Xb(301c), Xb(301e), v1, v1, t2), (Xb(301e), Xb(3010, v1, v0, t4)\}] \quad \text{(Equation 2)}$$

Prior to the transport start instruction, the module drive instruction is transmitted in advance from the transport controller 40 to the control unit 4. The control unit 4 stores the received module drive instruction in the storage unit 402. Then, in response to receiving the transport start instruction from the transport controller 40, the control unit 4 performs position control of the carriage 2 in accordance with the module drive instruction stored in the storage unit 402.

Figure 5:
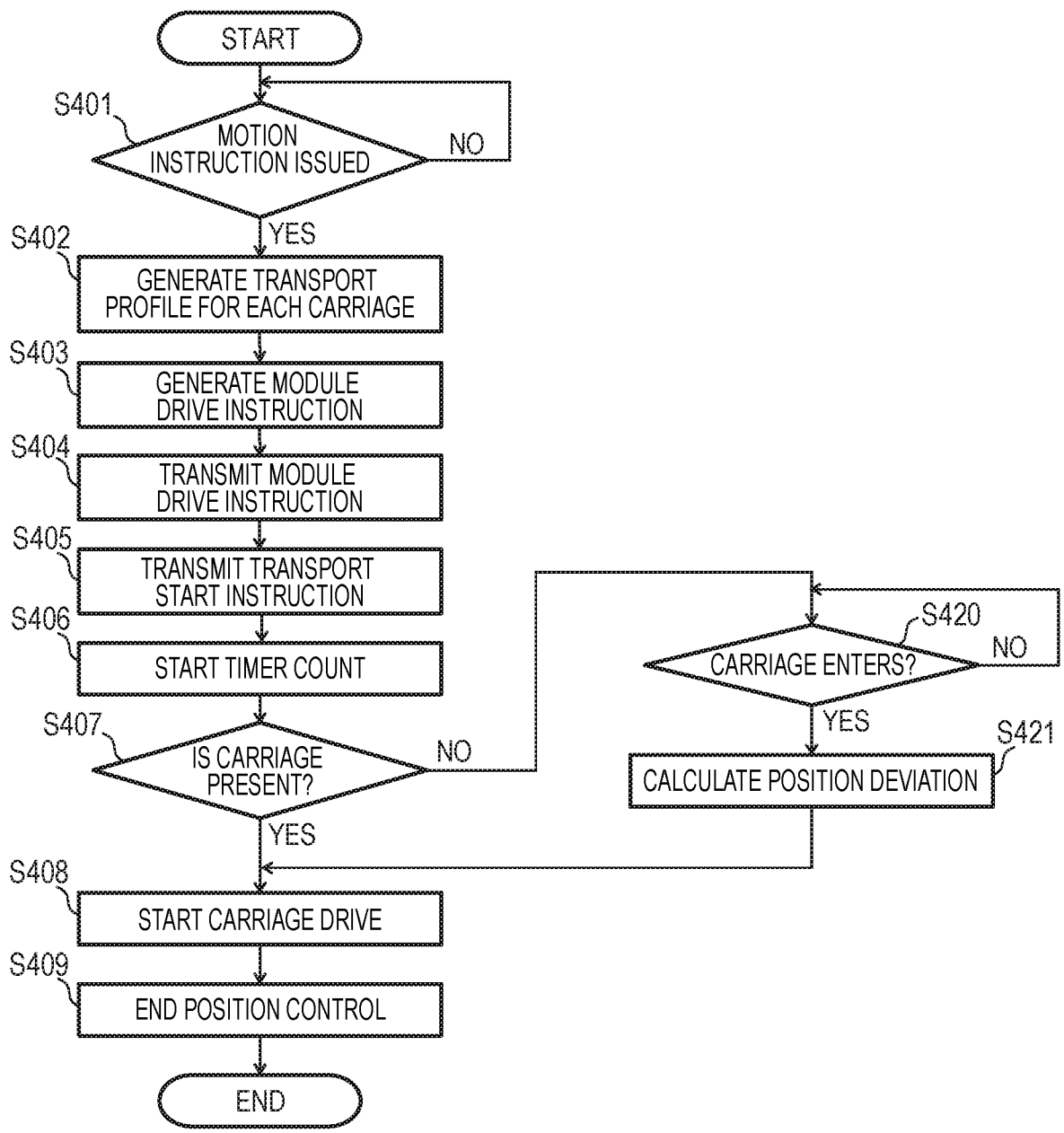
FIG. 5 is a flowchart illustrating the control method of the transport system according to the first embodiment of the present invention.

FIG. 5 is a flowchart illustrating the control method of the transport system of the present embodiment. First, the transport controller 40 determines whether or not there is a motion instruction received from the process controller 50 (step S401). The motion instruction instructs the control unit 4 to move the carriage 2 and also includes information indicating a transport method of the carriage 2. If the motion instruction is not present (step S401, No), the transport controller 40 returns to step S401 and stands by for the motion instruction from the process controller 50. If the motion instruction is present (step S401, Yes), the transport controller 40 performs a process of step S402.

Subsequently, the instruction value generation unit 41 of the transport controller 40 generates a transport profile for each carriage 2 (step S402). The transport controller 40 generates the drive profile in accordance with the transport method, and the drive profile may be associated with information of the transport method.

The transport controller 40 further aggregates the drive profiles of each carriage 2 for each transport module 10 and generates the module drive instruction (step S403). The transport controller 40 transmits the module drive instruction to each control unit 4 (step S404). That is, the transport controller 40 sequentially transmits the module drive instructions in each transport module 10 related to one carriage 2. The transport controller 40 transmits the transport start instruction to each control unit 4 (step S405).

In response to receiving the transport start instruction, the control unit 4 causes the calculation unit 404 to start counting the count value of the timer unit 405 (step S406). When the count of the timer unit 405 reaches the control start time instructed by the module drive instruction, the control unit 4 determines whether or not the carriage 2 is present on the transport module 10 (step S407). That is, the control unit 4 determines whether or not the carriage 2 is present on the transport module 10 at a predetermined control start time.

If the carriage 2 is present on the transport module 10 at the control start time (step S407, Yes), the control unit 4 starts driving the carriage 2 (step S408). The control unit 4 drives the carriage 2 in accordance with the module transport instruction (step S409). In FIG. 4A and FIG. 4B, for example, when the control unit 4b detects that the carriage 2 enters the transport module 10b at the control start timing, the control unit 4b starts transport of the carriage 2 based on the module drive instruction. Upon the completion of the transport in accordance with the module drive instruction, the control unit 4a ends position control (step S409).

On the other hand, if the carriage 2 is not present in the transport module 10 at the control start timing (step S407, No), the control unit 4 stands by until the carriage 2 enters the transport module 10 (step S420). If the carriage 2 reaches the transport module 10 with a delay from a predetermined control start timing (step S420, Yes), the control unit 4 calculates a position deviation of the carriage 2 (step S421). The position FB control unit 407 of the control unit 4b starts driving the carriage 2 based on the position deviation (step S408). Further, the control unit 4b drives the carriage 2 in accordance with the module drive instruction and ends position control (step S409).

Figure 6A:
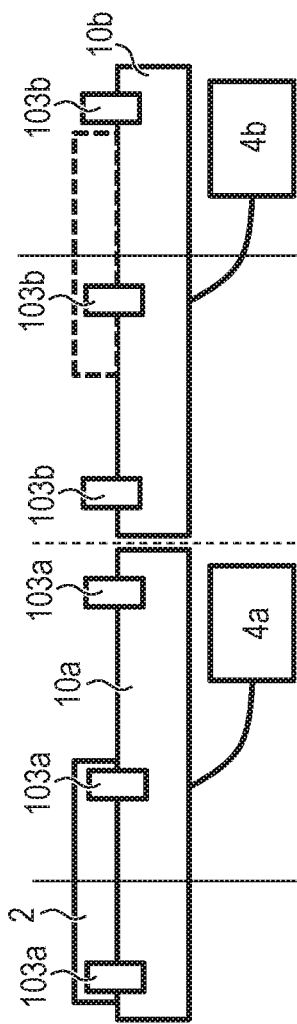
FIG. 6A and FIG. 6B are diagrams illustrating the control method of the transport system according to the first embodiment of the present invention.
Figure 6B:
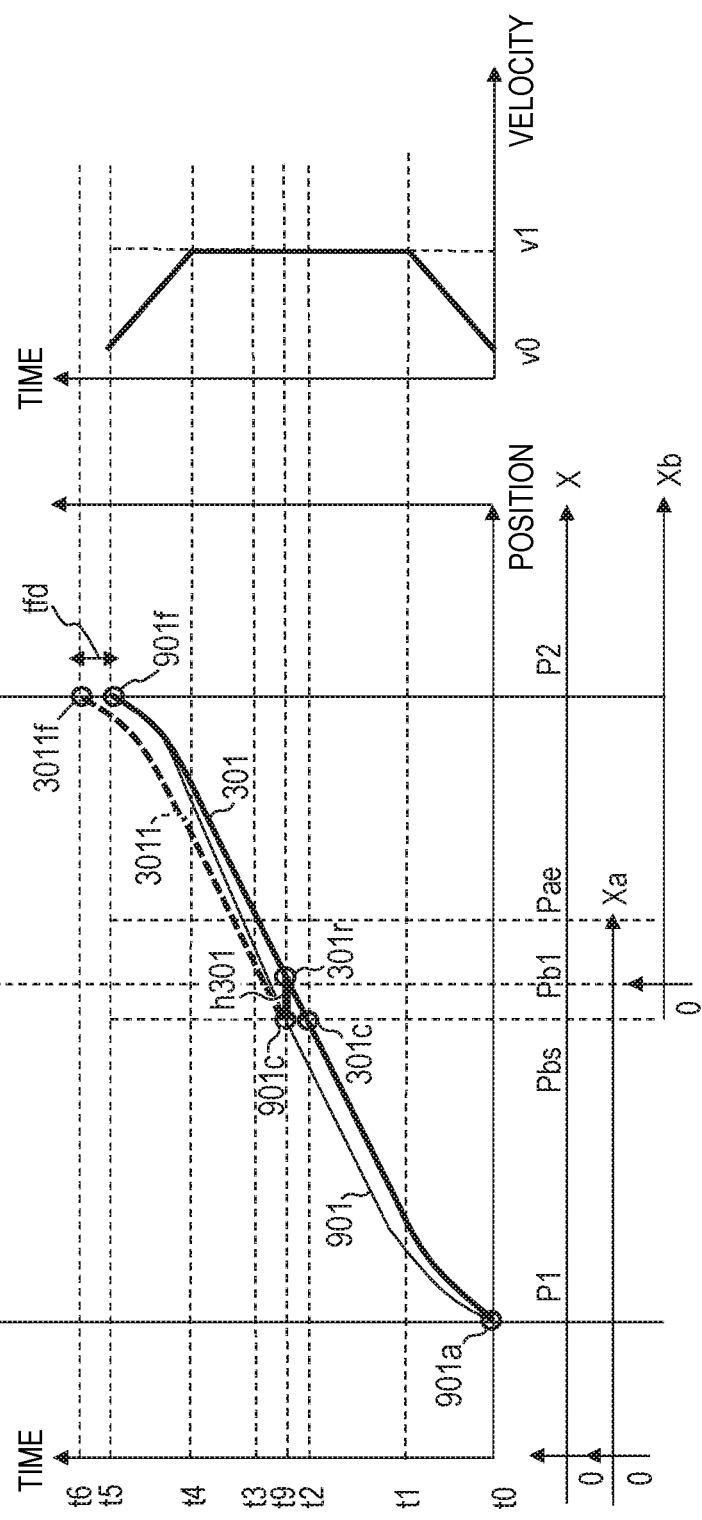

Subsequently, a calculation process of the position deviation described above will be described in detail. FIG. 6A and FIG. 6B are diagrams illustrating the control method according to the present embodiment and correspond to FIG. 4A and FIG. 4B. That is, FIG. 6A represents the general configuration of the transport system in which the carriage 2 moves across two transport modules 10a and 10b. The left diagram in FIG. 6B represents the transport profile 301 and a carriage FB position 901 in which the position of the carriage 2 is plotted on a unit time basis. In the left diagram in FIG. 6B, the horizontal axis represents the position of the carriage 2 in the X-direction, and the vertical axis represents time. Further, the right diagram in FIG. 6B represents the transport profile 301 of the left diagram in FIG. 6B as a velocity profile, the horizontal axis represents velocity of the carriage 2, and the vertical axis represents time. Position control of the carriage 2 is performed by the control units 4a and 4b connected to the two transport modules 10a and 10b.

In the left diagram in FIG. 6B, the carriage FB position 901 represents an actual position of the carriage 2. The position FB control unit 407 compares the target position of the carriage 2 with the carriage FB position 901 and generates the current instruction value in accordance with the comparison result. In the present embodiment, the carriage FB position 901 is the actual position information of the carriage 2 determined by the position determination unit 406 or position information calculated by the calculation unit 404.

The carriage 2 is stopped on the transport module 10a, and in response to receiving the transport start instruction from the transport controller 40, the control units 4a and 4b start position control of the carriage 2. That is, at the time t0, the carriage 2 starts moving at the velocity v0 from a stop state. In the transport profile 301, the carriage 2 is scheduled to reach the velocity v1 (>v0) at the time t1 and move to a position Pbs at the time t2. At the time t2, however, the carriage 2 has not yet reached the position Pbs at which the control unit 4b starts control, and there is a delay in transport. In this case, the control unit 4b turns to a state of standing by for the carriage 2 to enter the transport module 10b (see step S420 in FIG. 5). At the time t9, when the carriage 2 enters the transport module 10b and turns to a state (entry timing) in which the scale 26 can be read by the position detection unit 103b, the control unit 4b starts position control in the transport module 10b. That is, in the control unit 4b, the calculation unit 404 calculates a position deviation (see step S421 in FIG. 5).

In the present embodiment, the control start time (t2) is preset in the control unit 4b. When the carriage 2 is not detected at the control start time, it is possible to calculate a position deviation based on time t9 at which the carriage 2 is actually detected. The calculation unit 404 of the control unit 4b can calculate the position deviation according to the following equation by using the point 301c corresponding to the preset control start time t2 and a point 301r corresponding to the time t9 of entry of the carriage 2 determined by the position determination unit 406.

$$Xb(301c)-Xb(301r)=h301 \quad \text{(Equation 3)}$$

Here, the value Xb (301c) represents a position corresponding to the point 301c in the transport profile 301 and is a position corresponding to the control start time t2 of the module drive instruction stored in the control unit 4b. The value Xb (301r) represents a position corresponding to the time t9 at which the carriage 2 enters the transport module 10b and is calculated from the point 301r corresponding to the time t9 in the transport profile 301. The position FB control unit 407 calculates a difference between Xb (301c) and Xb (301r) as the position deviation h301.

Therefore, when the carriage 2 enters the transport module 10b at the time t9 that is delayed from the control start time t2 (see step S420 in FIG. 5), a target position Ref (t) of the carriage 2 calculated by the target position generation unit 403 is expressed by the following equation.

$$Ref(t9)=Xb(301r) \quad \text{(Equation 4)}$$

On the other hands, when the carriage 2 is transported to the transport module 10b in accordance with the transport profile without delay and the control unit 4b can start position control at the control start time t2 (see step S407 in FIG. 5), the target position of the carriage 2 is expressed by the following equation.

$$Ref(t2)=Xb(301c) \quad \text{(Equation 5)}$$

The position FB control unit 407 generates the control instruction value based on the position deviation between the target position Ref described above and the actual position of the carriage 2 and drives the carriage 2. That is, the position FB control unit 407 performs position control by using the actual position information of the carriage 2 determined by the position determination unit 406. According to the present embodiment, by setting the control start time for each transport module 10, it is possible to reduce a delay in the transport of the carriage 2 and stabilize control between a plurality of transport modules 10.

An operation in a case where the calculation of the position deviation described above is not performed will be described below as a comparative example. In this case, in FIG. 6B, since the position deviation of the carriage 2 is not calculated at the time t9, the control unit 4b starts position control with the position deviation as being zero regardless of the presence or absence of a delay of the carriage 2. That is, the target position of the carriage 2 calculated in the target position generation unit 403 is expressed by the following equation.

$$Ref(t9)=Xb(301c) \quad \text{(Equation 6)}$$

The transport profile in the transport module 10b is a transport profile 3011 indicated by the dotted line. The transport profile 3011 is delayed from the transport profile 301 by the time (t9–t2). Therefore, the time when the carriage 2 reaches the position P2 corresponding to a point 3011f is time t6, and a delay of time tfd occurs. In this case, by the carriage 2 traveling across the many transport modules 10, the transport delay time tfd is accumulated.

Further, in a section (from the position Pbs to the position Pae) in which the control units 4a and 4b simultaneously perform transport control of the carriage 2, the carriage 2 is position-controlled by control instruction values different from each other. For example, the control unit 4a tries to accelerate the carriage 2 that has not yet reached the target position, and the control unit 4b tries to decelerate the carriage 2 having a high entry velocity. As a result, the carriage 2 repeats fast acceleration and fast deceleration, and the position control of the carriage 2 becomes unstable.

When the position deviation for the transport profile 301 occurs when the carriage 2 enters the transport module 10 and two control units 4a and 4b cannot share the position deviation, position control of the carriage 2 may become unstable as described above. In Japanese Patent Application Laid-Open No. 2015-208083, to share position information, a switch unit for switching a signal input to the current controller is provided. As described above, however, providing the switch unit results in an increase in cost and an increase in complexity of the device and control. Further, while it is conceivable to perform communication among a plurality of control units 4 in order to share position information, it is necessary to establish communication in a cycle that is more than twice the position control cycle of the carriage 2. Therefore, the device and control become complex, and problems such as an increase in cost may occur.

In contrast, in the present embodiment, by adding the control start time to the module drive instruction, the position deviation can be calculated at the predetermined control start time in the control unit to be entered. It is therefore possible to reduce a difference in arrival time of a carriage relative to a profile and stabilize transport control when the carriage enters the transport module. Further, according to the present embodiment, since it is not necessary to use a switch unit to share position information among a plurality of control units, it is possible to realize stable transport control without increasing cost or increasing complexity of the device. While an example in which the control start timing is used as the control start time is illustrated in the present embodiment, the control start timing may be a time after a predetermined instruction is received (for example, the transport start instruction).

According to the present embodiment, it is possible to provide the transport system and the control method thereof that an improve controllability of a carriage near the boundary of the transport module with a simple configuration.

Second Embodiment

Next, a transport system in a second embodiment will be described. The same configurations as those of the first embodiment are labeled with the same references, and the configuration different from the first embodiment will be mainly described below.

Figure 7A:
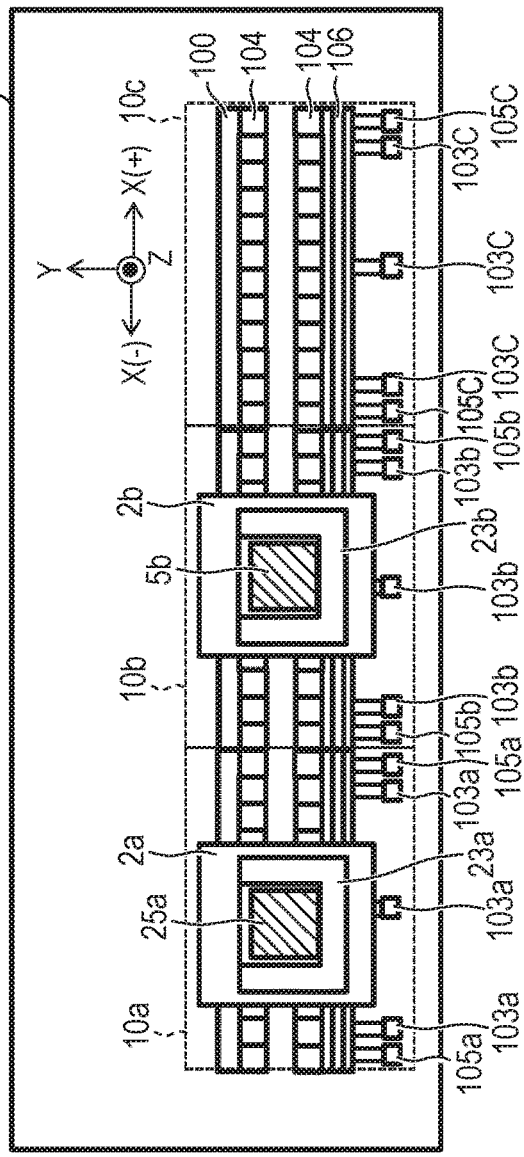
FIG. 7A, FIG. 7B, and FIG. 7C are schematic diagrams illustrating a configuration of a transport system according to a second embodiment of the present invention.
Figure 7B:
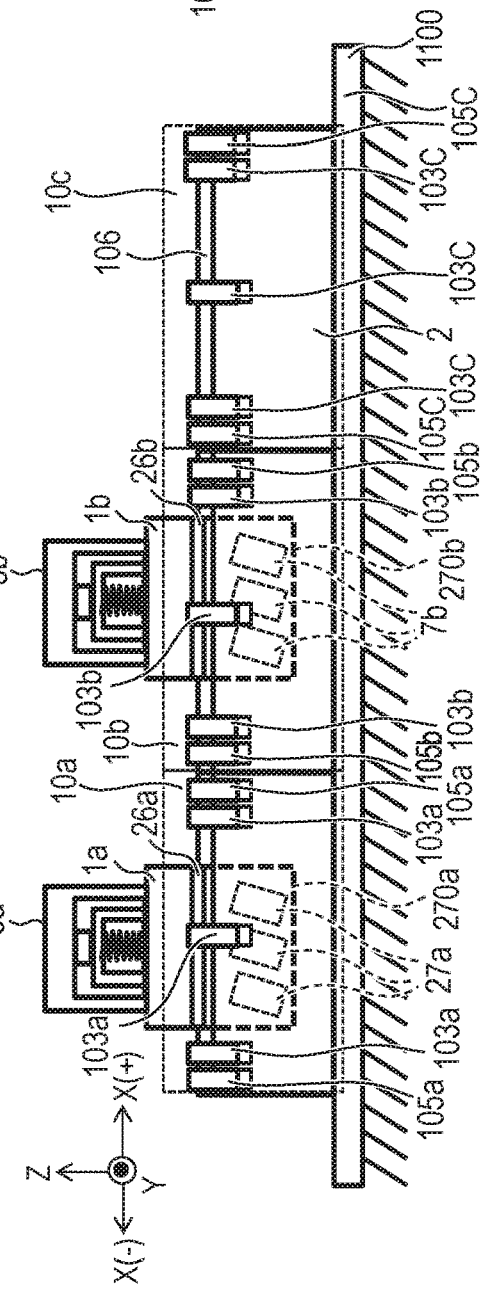
Figure 7C:
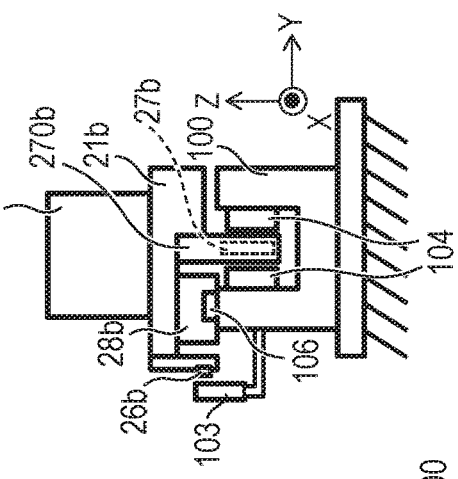

FIG. 7A, FIG. 7B, and FIG. 7C are schematic diagrams of a configuration of a transport system according to the present embodiment. FIG. 7A is a top view of the transport system, FIG. 7B is a side view of the transport system, and FIG. 7C is a front view of the transport system. Note that, in FIG. 7A, FIG. 7B, and FIG. 7C, a moving (traveling) direction of a carriage 2 is denoted as the X-axis direction, a vertical direction is denoted as the Z-axis direction, and a direction orthogonal to the X-axis direction and the Z-axis direction is denoted as the Y-axis direction. Further, in the X-axis, a direction from a carriage 2a to a carriage 2b, that is, a direction toward the downstream side of a transport path is denoted as positive (+), and the opposite direction thereto is denoted as negative (−).

In the present embodiment, the velocity detection unit 105 that determines the velocity of the carriage 2 is attached to each end of the transport module 10. That is, the velocity detection unit 105a is attached to one end of the transport module 10, and the velocity detection unit 105b is attached to the other end. A plurality of transport modules 10 are connected to each other, and thereby a pair of velocity detection units 105a and 105b are formed. The velocity of the carriage 2 can be calculated based on the time difference of the carriage 2 detected by the velocity detection units 105a and 105b. Further, by providing the velocity detection unit 105 at the end of the transport module 10, it is possible to determine the velocity when the carriage 2 enters the transport module 10. The velocity detection unit 105 may be formed of an encoder similar to the position detection unit 103 but may be formed of another detector such as a detector using a laser light, for example.

FIG. 8 is a control block diagram of the present embodiment and mainly illustrates a detail configuration of the transport controller 40 and the control unit 4. In the present embodiment, a velocity FB control unit 409 is provided on the post-stage of a position FB control unit 407' in order to improve controllability of the carriage 2. The velocity FB control unit 409 performs feedback control based on a difference between the velocity instruction value in the transport profile 301 and the determined velocity of the carriage 2. The transport system in the present embodiment further enhances the responsiveness of the carriage 2 to the control instruction value by performing feedback control on a small change of the carriage 2 relative to the velocity instruction value.

In the same manner as the position determination unit 406 in the first embodiment, a position determination unit 406' determines the position of the carriage 2 by using a signal that indicates position information from the position detection unit 103. Further, the position determination unit 406' can calculate the velocity of the carriage 2 by differentiating position information of the carriage 2 by using a differentiator inside the position determination unit 406' and can determine the velocity of the carriage 2. The calculated velocity of the carriage 2 is output to the velocity FB control unit 409.

In the same manner as the position FB control unit 407 in the first embodiment, the position FB control unit 407' compares the position of the carriage 2 determined by the position determination unit 406' with the target position of the carriage 2 generated by the target position generation unit 403 and outputs the comparison result as a control value to the velocity FB control unit 409.

Position information from the velocity detection unit 105 is input to the velocity determination unit 408. The velocity determination unit 408 has a differentiator and calculates the velocity of the carriage 2 by differentiating input position information. As described above, since the velocity detection unit 105 is provided at the end of the transport module 10, the velocity determination unit 408 can calculate the velocity at which the carriage 2 enters the transport module 10.

The velocity FB control unit 409 compares velocity information of the carriage 2 determined by the position determination unit 406' with the control value output from the position FB control unit 407' and outputs the comparison result as a control instruction value to the current FB control unit 410. When the carriage 2 enters the transport module 10 and the control unit 4 starts transport control of the carriage 2, the velocity FB control unit 409 generates the control instruction value by using the velocity determined by the velocity determination unit 408 and outputs the control instruction value to the current FB control unit 410.

Figure 9:
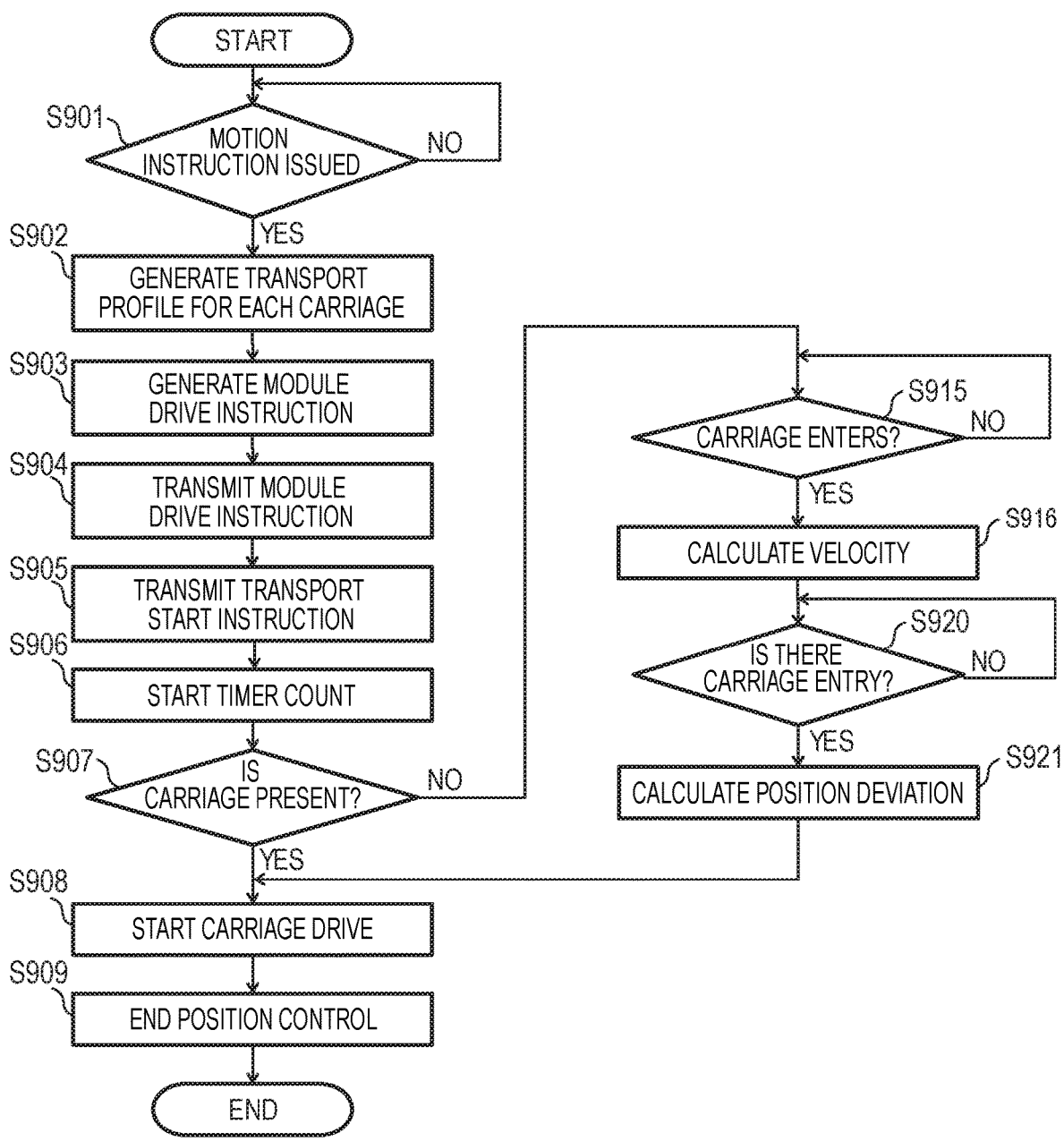
FIG. 9 is a flowchart illustrating a control method of the transport system according to the second embodiment of the present invention.

FIG. 9 is a flowchart illustrating the transport control of the carriage 2 by the transport system of the present embodiment. In the same manner as the first embodiment, if a motion instruction is issued from the process controller 50 (step S901, Yes), the transport controller 40 generates a transport profile for each carriage 2 (step S902). The transport controller 40 generates the module drive instruction for each transport module 10 (step S903) and transmits the module drive instruction to each control unit 4 (step S904). Subsequently, the transport controller 40 transmits the transport start instruction to each control unit 4 (step S905), and each control unit 4 starts counting the count value of the timer unit 405. When the count value of the timer unit 405 reaches the control start time instructed by the module drive instruction, the control unit 4 determines whether or not the carriage 2 is present on the transport module 10 (step S907).

If the carriage 2 is present on the transport module 10 at the control start time (step S907, Yes), the control unit 4 starts driving the carriage 2 (step S908). The control unit 4 drives the carriage 2 in accordance with the module drive instruction, and upon the completion of the transport in accordance with the module transport instruction, the control unit 4 ends position control (step S909). If the carriage 2 is not present on the transport module 10 at the control start time (step S907, No), the control unit 4 stands by for the carriage 2 to enter the transport module 10 (step S915, No). Since the velocity detection unit 105 is provided at the end of the transport module 10, the velocity detection unit 105 first detects the entry of the carriage 2 on the transport module 10. If the velocity detection unit 105 detects the entry of the carriage 2 on the transport module 10 (step S915, Yes), the velocity determination unit 408 calculates the velocity of the carriage 2 based on position information on the velocity detection unit 105 (step S916).

Further, until the position detection unit 103 detects the carriage 2, the control unit 4 stands by the entry of the carriage 2 (step S920). If the carriage 2 enters the transport module 10 and the position detection unit 103 detects the carriage 2 (step S920, Yes), the control unit 4 calculates the position deviation of the carriage 2 (step S921). Further, the control unit 4 starts driving the carriage 2 based on the position deviation (step S908) and performs position control in accordance with the module drive instruction (step S909). Here, the control unit 4 uses velocity information calculated by the position determination unit 406' in position control. The control unit 4 drives the carriage 2 in accordance with the module drive instruction and ends position control (step S909).

According to the present embodiment, in addition to the advantage described in the first embodiment, the following advantage can be further achieved. That is, the use of the velocity of a carriage in position control can improve control responsiveness. Further, by providing the velocity detection unit on the end side of the transport module, it is possible to perform stable position control immediately after the carriage enters the transport module.

Third Embodiment

Next, a transport system according to a third embodiment will be described. A configuration different from the second embodiment will be mainly described below. The transport system of the present embodiment further transmits a module drive instruction for the transport module on the upstream side to the control unit in addition to the module drive instruction of the transport module corresponding to the control unit. Thereby, in the control unit on the downstream side, position deviation in the transport module on the upstream side can be estimated, and it is possible to calculate an integral value of the position deviation near the boundary of the transport module.

Figure 10:
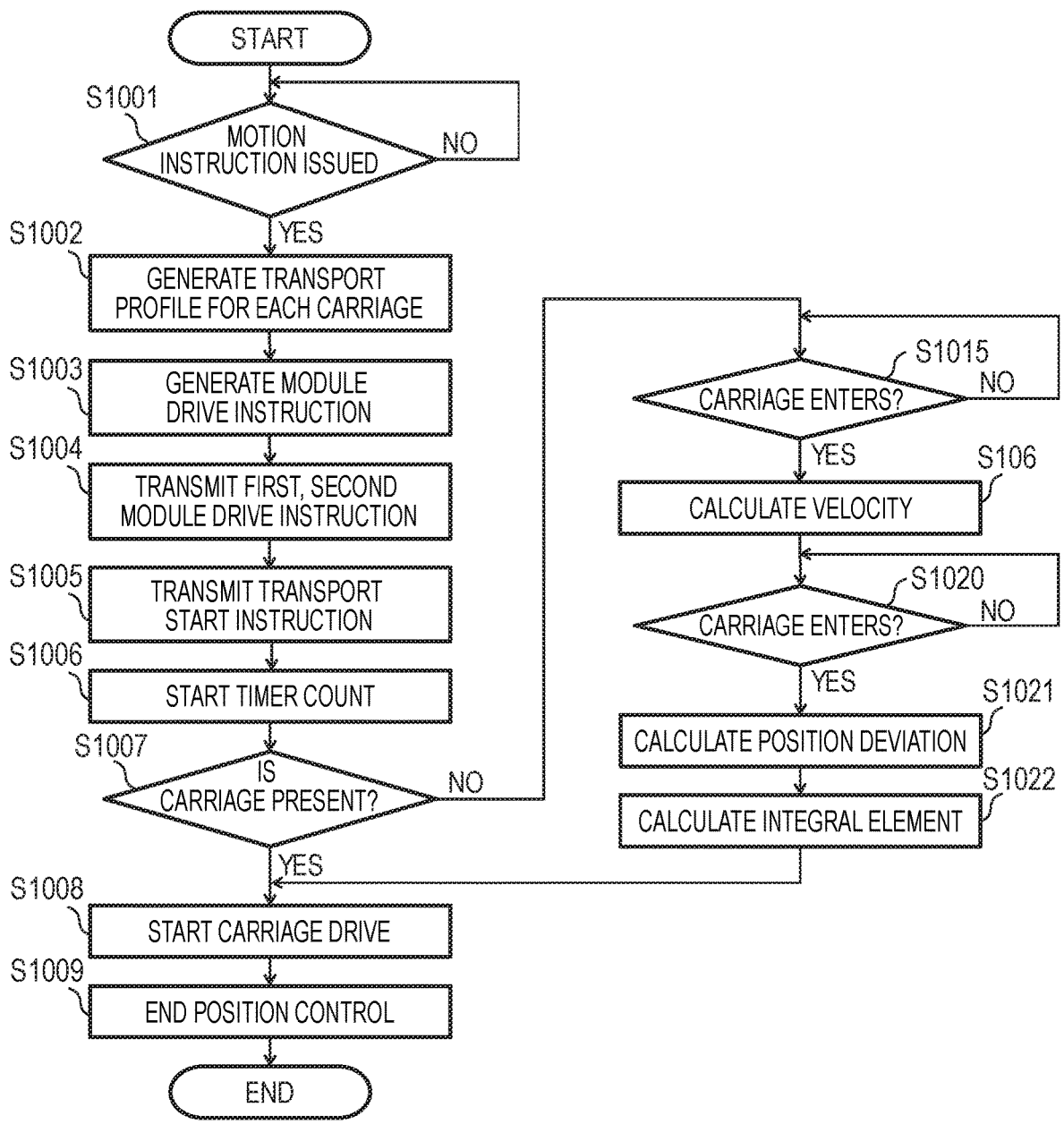
FIG. 10 is a flowchart illustrating a control method of a transport system according to a third embodiment of the present invention.

FIG. 10 is a flowchart illustrating transport control of the carriage 2 according to the transport system of the present embodiment. As illustrated in FIG. 7A, FIG. 7B, and FIG. 7C, the carriage 2 is here transported from the transport module (a first transport module) 10a to a transport module (a second transport module) 10b. In the same manner as the second embodiment, if the motion instruction is issued from the process controller 50 (step S1001, Yes), the transport controller 40 generates a transport profile for each carriage 2 (step S1002). The transport controller 40 further generates the module drive instruction for each transport module 10 (step S1003) and transmits two module drive instructions to the control unit 4, respectively (step S1004). In FIG. 7A, FIG. 7B, and FIG. 7C, for example, a module drive instruction (a first drive condition) for driving the upstream-side transport module 10a and a second module drive instruction (a second drive condition) for driving the transport module 10b are transmitted to the control unit (a second control unit) 4b of the transport module 10b. In the same way, a first module drive instruction of the upstream-side transport module (not illustrated) and a second module drive instruction for driving the transport module 10a are transmitted to the control unit (a first control unit) 4a.

Subsequently, the transport controller 40 transmits the transport start instruction to each control unit 4 (step S1005), and each control unit 4 starts counting the count value of the timer unit 405. When the count value of the timer unit 405 reaches the control start time instructed by the module drive instruction, the control unit 4 determines whether or not the carriage 2 is present on the transport module 10 (step S1007).

If the carriage 2 is present on the transport module 10 at the control start time (step S1007, Yes), the control unit 4 starts driving the carriage 2 (step S1008) and performs transport control in accordance with the module drive instruction (step S1009). The control unit 4b performs transport control in accordance with the second module drive instruction for the transport module 10b, for example. If the carriage 2 is not present in the transport module 10 at the control start time (step S1007, No), the control unit 4 stands by for the carriage 2 to enter the transport module 10 (step S1015, No). If the velocity detection unit 105 detects the entry of the carriage 2 on the transport module 10 (step S1015, Yes), the velocity determination unit 408 calculates the velocity of the carriage 2 based on position information of the velocity detection unit 105 (step S1016).

Subsequently, until the position detection unit 103 detects the carriage 2, the control unit 4 stands by for the entry of the carriage 2 (step S1020). If the carriage 2 enters the transport module 10 and the position detection unit 103 detects the carriage 2 (step S1020, Yes), the control unit 4 calculates the position deviation of the carriage 2 (step S1021). Further, the control unit 4 estimates the history of the position deviation e(t) in the upstream transport module based on the upstream first module drive instruction and calculates an integral element (second term) in PID control expressed by the following equation (step S1022).

$$m(t) = K_P \left\{ e(t) + \frac{1}{T_I} \int_{t-\tau}^{t} e(t) dt + T_D \frac{de(t)}{dt} \right\}$$

Here, the value m(t) denotes a control instruction value at time t, the value e(t) denotes a position deviation at time t, the value Kp denotes a proportional coefficient, the value TI denotes an integral coefficient, and the value TD represents a differential coefficient. In FIG. 6A and FIG. 6B, for example, it is assumed that the position deviation e(t) when the carriage 2 enters the transport module 10b is h301. In accordance with the first module drive instruction in the transport module 10a, the carriage 2 is scheduled to move at a constant velocity v1 from the time t1 to t2. It is therefore estimated that the position deviation h301 has continuously occurred in a predetermined integration period T before the control start time t9. Further, when the first module drive instruction indicates acceleration of the carriage 2 before the control start time, it is estimated that the position deviation e(t) gradually increases in the predetermined integration period T. Based on the history of the position deviation e(t) estimated as described above, the control unit 4b can calculate the integral element at the control start time.

The control unit 4 starts driving the carriage 2 based on the position deviation, the integral element, and the differentiation element calculated in the process described above (step S1008) and performs position control in accordance with the module drive instruction (step S1009). Here, the control unit 4 uses velocity information calculated by the position determination unit 406' in transport control. The control unit 4 drives the carriage 2 in accordance with the module drive instruction and ends position control (step S1009).

As described above, the transport system in the present embodiment can achieve the following advantage in addition to the advantages described in the first and second embodiments. That is, the transport system in the present embodiment transmits the module drive instruction of the upstream transport module to the control unit in addition to the module drive instruction of the transport module to be controlled. Thereby, the control unit can estimate the history of the position deviation in the upstream transport module and calculates the integral element in the PID control can be performed. Thereby, when the integration control is performed across a plurality of transport modules, the carriage 2 can be stably controlled. When the carriage 2 is stopped near the boundary of the transport module, for example, it is possible to control the stop position of the carriage at high accuracy near the boundary of the transport module without the carriage exhibiting an unstable behavior.

Note that the number of the module drive instructions transmitted to one control unit is not limited to that in the example described above. For example, the upstream module drive instructions for two or more control targets may be transmitted. In such a way, it is possible to estimate the integral elements in a longer integration period.

Another Embodiment

The present invention is not limited to the embodiments described above, and modifications in various forms are possible. In the embodiments described above, while the timer unit used for determination of the control start time starts counting time in response to a transport start instruction, any type of instruction or signal may be used as long as the timer units are synchronized in a plurality of control units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-092353, filed May 11, 2018, which is hereby incorporated by reference herein in its entirety.

What is claimed is:

1. A transport system comprising:
    a plurality of transport modules forming a transport path on which a carriage travels; and
    a plurality of control units each provided to corresponding one of the plurality of transport modules and configured to perform position control of the carriage in accordance with a pre-stored drive condition and a control start timing,
    wherein one of the plurality of control units which corresponds to a first transport module that is one of the plurality of transport modules corrects the drive condition by using a difference between an entry timing at which the carriage enters the first transport module and the control start timing.

2. The transport system according to claim 1 further comprising a position detection unit that determines a position of the carriage on the transport module,
    wherein the control unit defines a timing at which the carriage is detected by the position detection unit as the entry timing.

3. The transport system according to claim 2, wherein in the control start timing, the control unit calculates a position deviation between a position of the carriage determined by the position detection unit and a target position set by the drive condition and starts the position control based on the position deviation.

4. The transport system according to claim 3, wherein if the position detection unit is unable to detect the carriage at the control start timing, the control unit causes start of the position control to stand by until the entry timing.

5. The transport system according to claim 4,
    wherein the control unit comprises a timer used for determining the control start timing, and
    wherein the timer starts counting time when the plurality of control units simultaneously receive a predetermined instruction and define a time after a predetermined time period from the reception as the control start timing.

6. The transport system according to claim 5, wherein the predetermined instruction is a transport start instruction to start transport of the carriage.

7. The transport system according to claim 6,
    wherein the transport module has a set of coils, wherein the carriage has a magnet that receives electromagnetic force from the set of coils, and wherein the control unit performs the position control by controlling a current flowing in the set of coils.

8. The transport system according to claim 6 further comprising a higher-level control unit that can communicate with a plurality of the control units, wherein the higher-level control unit transmits the drive condition and the transport start instruction to each of the plurality of control units.

9. The transport system according to claim 8, wherein the control unit changes the drive condition stored in the control unit based on the position deviation and performs the position control based on the drive condition being changed.

10. The transport system according to claim 3 further comprising a velocity detection unit that determines a velocity of the carriage on the transport module, wherein the control unit performs the position control by using the velocity of the carriage determined by the velocity detection unit.

11. The transport system according to claim 10, wherein the velocity detection unit is arranged at each end of the transport module.

12. The transport system according to claim 3, wherein a plurality of the transport modules include a first transport module and a second transport module that the carriage enters from the first transport module, wherein a plurality of the control units include a first control unit that performs the position control in the first transport module in accordance with a first drive condition and a second control unit that performs the position control in the second transport module in accordance with a second drive condition, and wherein the second control unit pre-stores the first drive condition together with the second drive condition and estimates the position deviation occurring before the control start timing by using a position of the carriage determined by the position detection unit at the control start timing and the first drive condition.

13. The transport system according to claim 12, wherein the second control unit performs the position control by using an integral value of the estimated position deviation.

14. A control method of a transport system including a plurality of transport modules forming a transport path on which a carriage travels and a plurality of control units each provided to corresponding one of the plurality of transport modules and configured to perform position control of the carriage in accordance with a pre-stored drive condition and a control start timing, the control method comprising a step of:

at one of the plurality of control units which corresponds to a first transport module that is one of the plurality of transport modules, correcting the drive condition by using a difference between an entry timing at which the carriage enters the first transport module and the control start timing.

15. A processing system comprising:

the transport system according to claim 1; and a process apparatus that applies processing to a work transported by the carriage.

16. A manufacturing method of an article that manufactures an article by using the processing system according to claim 15, the manufacturing method comprising steps of:

transporting the work by the carriage; and applying the processing by the process apparatus to the work transported by the carriage.

* * * * *